United States Patent [19]

Chou et al.

[11] Patent Number: 5,797,123
[45] Date of Patent: Aug. 18, 1998

[54] METHOD OF KEY-PHASE DETECTION AND VERIFICATION FOR FLEXIBLE SPEECH UNDERSTANDING

[75] Inventors: Wu Chou, Berkeley Heights; Biing-Hwang Juang, Warren, both of N.J.; Tatsuya Kawahara, Kyoto, Japan; Chin-Hui Lee, New Providence, N.J.

[73] Assignee: Lucent Technologies Inc., Murray Hill, N.J.

[21] Appl. No.: 771,732

[22] Filed: Dec. 20, 1996

Related U.S. Application Data

[63] Continuation of Ser. No. 724,413, Oct. 1, 1996, abandoned.

[51] Int. Cl.[6] .................................................. G10L 9/00
[52] U.S. Cl. .................... 704/256; 704/240; 704/255; 704/257
[58] Field of Search ................................. 704/256, 255, 704/254, 240, 243, 231, 241, 251, 253, 257, 200, 236, 239, 252

[56] References Cited

U.S. PATENT DOCUMENTS

| | | | |
|---|---|---|---|
| 5,509,104 | 4/1996 | Lee et al. | 704/256 |
| 5,625,748 | 4/1997 | McDonough et al. | 704/251 |
| 5,649,057 | 7/1997 | Lee et al. | 704/256 |
| 5,675,706 | 10/1997 | Lee et al. | 704/256 |
| 5,680,511 | 10/1997 | Baker et al. | 704/257 |

*Primary Examiner*—Richemond Dorvil
*Attorney, Agent, or Firm*—Kenneth M. Brown

[57] ABSTRACT

A key-phrase detection and verification method that can be advantageously used to realize understanding of flexible (i.e., unconstrained) speech. A "multiple pass" procedure is applied to a spoken utterance comprising a sequence of words (i.e., a "sentence"). First, a plurality of key-phrases are detected (i.e., recognized) based on a set of phrase sub-grammars which may, for example, be specific to the state of the dialogue. These key-phrases are then verified by assigning confidence measures thereto and comparing these confidence measures to a threshold, resulting in a set of verified key-phrase candidates. Next, the verified key-phrase candidates are connected into sentence hypotheses based upon the confidence measures and predetermined (e.g., task-specific) semantic information. And, finally, one or more of these sentence hypotheses are verified to produce a verified sentence hypothesis and, from that, a resultant understanding of the spoken utterance.

32 Claims, 2 Drawing Sheets

1

METHOD OF KEY-PHASE DETECTION AND VERIFICATION FOR FLEXIBLE SPEECH UNDERSTANDING

CROSS-REFERENCE TO RELATED APPLICATION

The present application is a continuation of co-pending U.S. patent application entitled "Method of Key-Phrase Detection and Verification for Flexible Speech Understanding," by Biing-Hwang Juang, Tatsuya Kawahara, and Chin-Hui Lee, Ser. No. 08/724,413, filed Oct. 1, 1996, now abandoned.

FIELD OF THE INVENTION

The present invention relates generally to the field of speech recognition and more particularly to methods for understanding spoken dialogue.

BACKGROUND OF THE INVENTION

In the past several years, spoken dialogue recognition and understanding systems have been developed and evaluated in numerous "real world" applications. Several approaches have been employed. A first approach uses deterministic finite state grammars (FSG), limited to the task or application at hand, to accept (and thereby to recognize and ultimately understand) user utterances. In such systems, the recognizer tries to match or decode the entire spoken input into any of the possible (i.e., acceptable in accordance with the fixed grammar) word sequences.

The use of such rigid grammars is, in fact, reasonably effective when the system is provided with substantially in-grammar sentences. However, in most typical "real world" environments which are applicable to a large user population, a wide variation of utterances are encountered, many of which are not adequately covered by such task-based grammars. Such out-of-grammar utterances may include, for example, extraneous words, hesitations, repetitions and unexpected expressions. Even for apparently simple sub-tasks such as the recognition of a spoken date or time, it has been found that 20% or more of the spontaneous user utterances are likely to be out-of-grammar. Under such conditions, systems using these grammars perform poorly. And this poor performance occurs despite the fact that the grammars may have been carefully tuned during a trial period. The situation gets even worse when the task involves more complex queries. It has become clear that writing and then adequately tuning a fixed task-based grammar to cover such complex queries would require an inordinate amount of (human) time and effort.

The above problem originates from the framework of decoding that assumes a rigid sentence-level grammar and then applies a uniform requirement that the grammar be matched on the entire input. The use of "filler" models (for matching the out-of-grammar portions of the utterance) provides limited success for speech samples that mostly follow the rigid grammar, but leaves many common utterances unrecognized since it does not solve the fundamental problem inherent in using a fixed grammar.

Another approach to spoken dialogue recognition and understanding involves the use of statistical language models. These models are based not on a fixed predetermined grammar, but rather on a grammar which is developed statistically as a result of being trained with the use of large quantities of sample data. For example, the ATIS (Air Travel Information System) project sponsored by the U.S. Government (ARPA) was a comprehensive project on spoken dialogue processing which used a statistical language model approach. (See, e.g., D. A. Dahl, "Expanding the Scope of the ATIS Task: The ATIS-3 Corpus," *Proc. ARPA Human Language Technology Workshop*, pp. 43–48, 1994, which is hereby incorporated by reference as if fully set forth herein.) In this case, a substantial quantity of data were collected, and the use of a statistical language model was reasonably successful, even in its ability to recognize out-of-grammar utterances.

In typical "real world" applications, however, it is often not practical to provide such a large quantity of data for training statistical models, since the data collection task itself requires a great deal of (human) time and effort. For most applications, it is not practical to collect even enough data to construct a simple bigram language model for the given task. (Moreover, note that in the case of the ATIS system, the scenario and data collection performed was somewhat artificial and, as such, may not necessarily reflect the problems inherent in real world spontaneous utterances.) For these reasons, most of the dialogue systems deployed and tested in "real world" applications do, in fact, use deterministic finite state grammars, as described above, despite their limited ability to handle out-of-grammar utterances.

Another class of approaches which has been considered for the spoken dialogue recognition problem involves "word spotting" schemes, such as are described, for example, in R. C. Rose, "Keyword Detection in Conversational Speech Utterances Using Hidden Markov Model Based Continuous Speech Recognition," *Computer Speech and Language*, 9(9):309–333, 1995" and H. Tsuboi and Y. Takebayashi, "A Real-time Task-oriented Speech Understanding System Using Keyword-spotting," *Proc. IEEE-ICASSP*, volume 1, pp. 197–200, 1992, each of which is hereby incorporated by reference as if fully set forth herein. These approaches are classified into two categories depending on the method they use for the modeling of the non-keyword portions of an input utterance.

Word spotting schemes which can be classified in the first such category are based on the ability to recognize a large vocabulary. Examples of these schemes include those described in J. R. Rohlicek et al., "Phonetic Training and Language Modeling for Word Spotting," *Proc. IEEE-ICASSP*, volume 2, pages 459–462, 1993, and M. Weintraub, "Keyword-Spotting Using SRI's DECIPHER Large-Vocabulary Speech-Recognition System," *Proc. IEEE-ICASSP*, volume 2, pages 463–466, 1993, each of which is hereby incorporated by reference as if fully set forth herein. This technique incorporates as much lexical knowledge as possible, making many non-keyword vocabulary word models, as well as the keyword models, available to the system. However, this technique still cannot adequately model ill-formed phenomena such as the hesitations and self-repairs which are often found in spontaneous speech. That is, it does not solve the problem inherent to all uniform decoding approaches. Moreover, large vocabulary spontaneous speech recognition techniques suffer from performance and efficiency problems, especially when the task domain is limited.

The other category of word spotting schemes employs simple (i.e., limited vocabulary) word spotting with either a simple garbage model or a parallel network of subword models used to model the non-keyword portions of the input utterance. Examples of these schemes include those described in J. G. Wilpon et al., "Automatic Recognition of Keywords in Unconstrained Speech Using Hidden Markov Models," *IEEE Trans. Acoust., Speech & Signal Process.*, 38(11):1870–1878, 1990, and R. C. Rose and D. B. Paul, "A Hidden Markov Model Based Keyword Recognition System," *Proc. IEEE-ICASSP*, pages 129–132, 1990, each of which is hereby incorporated by reference as if fully set forth herein. Unfortunately, neither the garbage model nor the parallel network of subword models perform adequately in their attempts to match the non-keywords, and, therefore, the keyword models are often erroneously matched with the irrelevant (i.e., non-keyword) portions of the utterance. This results in many "false alarms" (i.e., erroneous "recognition" of keywords). In addition, most of the existing systems in this category "tune" the keyword models and the garbage model in a vocabulary-dependent manner, thereby sacrificing much of the advantage of a subword-based speech recognition approach. For these reasons, this category of word spotting schemes has been successfully applied only to tasks involving a very small vocabulary, such as, for example, the task of spoken digit recognition.

SUMMARY OF THE INVENTION

We have recognized that most spoken dialogue utterances (i.e., "sentences") contain certain keywords and "key-phrases" that are task-related, the recognition of which may advantageously lead to partial or full understanding of the utterance, while other portions of the utterance are not, in fact, relevant to the task and thus should be ignored. (Note that the term "sentence" will be used herein to mean any sequence of words, regardless of whether or not such sequence of words comprises a grammatically correct sentence structure. Also note that the use of the term "key-phrase" herein is intended to include sequences of one or more words—i.e., keywords are "key-phrases" of a single word.) That is, a flexible speech understanding system can be advantageously constructed based on an approach which detects the semantically significant portions of the sentence and rejects the irrelevant portions thereof. By relaxing conventional grammatical constraints and by focusing specifically on recognized sets of key-phrases, a wider variety of utterances can be advantageously accepted than can be accepted based, for example, upon a rigid, formal sentence grammar.

Thus, in accordance with an illustrative embodiment of the present invention, a key-phrase detection and verification technique that can be advantageously used to realize understanding of flexible (i.e., unconstrained) speech is provided. Specifically, a "multiple pass" procedure is applied to a spoken utterance comprising a sequence of words (i.e., a sentence). First, a plurality of key-phrases are detected (i.e., recognized) based on a set of phrase sub-grammars which may, for example, be specific to the state of the dialogue. These key-phrases are then verified by assigning confidence measures thereto and comparing the confidence measures to a threshold, resulting in a set of verified key-phrase candidates. Next, the verified key-phrase candidates are connected into sentence hypotheses based upon predetermined (e.g., task-specific) semantic information. The sentence hypotheses may also be generated based upon the individual key-phrase confidence measures. And finally, one or more of these sentence hypotheses are verified to produce a verified sentence hypothesis and, advantageously, a resultant understanding of the spoken utterance.

In addition, and particularly in dialogue-based systems, individual phrase sub-grammars may be advantageously employed according to the particular state of the dialogue within a larger scale task (i.e., for a "sub-task"). For example, within a dialogue-based automobile reservation task, the system might, at a given point in time, need to determine the date and time that the requested car will be needed. In this case, the anticipated response can be advantageously limited to being one which provides temporal information only. Combined with a flexible dialogue manager, a system in accordance with an illustrative embodiment of the present invention can successfully obtain at least a partial understanding of the spoken sentence. Moreover, any necessary disambiguation may be subsequently performed through a further dialogue session.

DETAILED DESCRIPTION

Introduction

Figure 1:
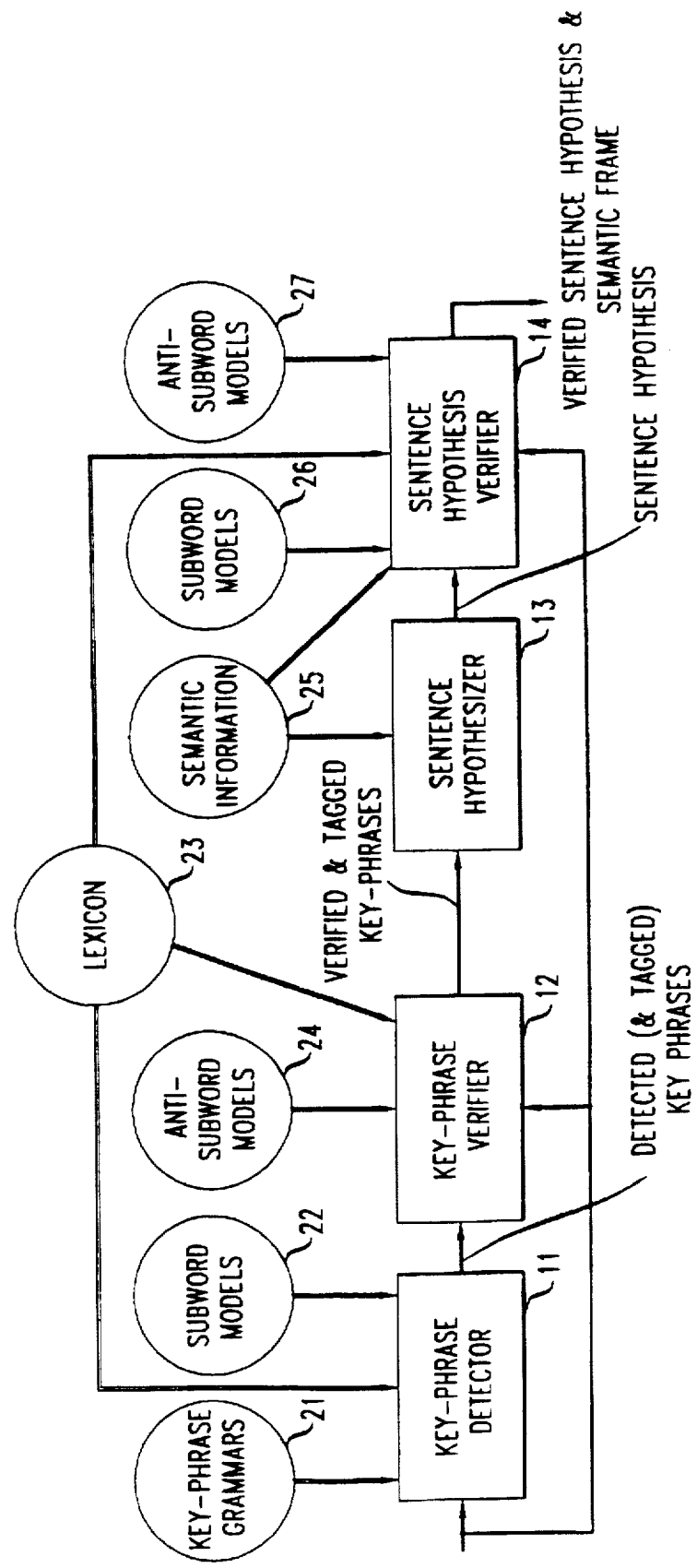
FIG. 1 shows a diagram of a system for performing speech recognition and understanding of a spoken utterance in accordance with an illustrative embodiment of the present invention.

In accordance with an illustrative embodiment of the present invention, a spoken dialogue recognition and understanding system is realized by recognizing the relevant portions of the utterance while not erroneously "recognizing" the irrelevant portions, (without, for example, using non-keyword large vocabulary knowledge) in a general framework of subword-based speech recognition. (Subword-based speech recognition, familiar to those of ordinary skill in the art, involves the modeling and matching of individual word segments such as syllables, demisyllables or phonemes. A lexicon or dictionary is then provided to map each word in the vocabulary to one or more sequences of these word segments—i.e., the subwords. Thus, the model corresponding to a word effectively comprises a concatenation of the models for the subwords which compose that word, as specified by the lexicon.) FIG. 1 shows a diagram of one illustrative system for performing speech recognition and understanding of a spoken utterance in accordance with an illustrative embodiment of the present invention.

Note that one of the most significant problems with prior art techniques is that conventional speech recognizers do not typically know how much confidence may be placed on its results. For this reason, in accordance with the illustrative embodiment of the present invention as shown in FIG. 1, verification methods that perform hypothesis tests on the recognized results and assign confidence measures thereto are advantageously employed. See, e.g., R. A. Sukkar et al., "A Vocabulary Independent Discriminitively Trained Method for Rejection of Non-Keywords in Subword-Based Speech Recognition," *Proc. EuroSpeech-95*, pp. 1629–1632, 1995, R. A. Sukkar et al., "Utterance Verification of Keyword Strings Using Word-Based Minimum Verification Error (WB-MVE) Training," *Proc. IEEE-ICASSP*, pp. 518–521, 1996, and M. Rahim et al., "Discriminitive Utterance Verification Using Minimum String Verification Error (MSVE) Training," *Proc. IEEE-ICASSP*, 1996, each of which is hereby incorporated by reference as if fully set forth herein. By integrating such utterance verification techniques into the illustrative system of FIG. 1, detection of keywords (or in the instant case, key-phrases) can be made more reliable—that is, improper matching to keyword models or "false alarms" can be substantially reduced.

In addition, however, the illustrative system of FIG. 1 goes even further to reduce such "false alarms." The system does not make a "final decision" as a result of these keyword (or key-phrase) matching and verification processes alone. Rather, a semantic analysis (i.e., sentence parsing) is performed based on combinations (i.e., sequences) of the verified keywords or key-phrases, resulting in sentence hypotheses which are then themselves verified with a separate verification process. In particular, this sentence hypothesis verification process is performed with a "partial input" comprising fewer subwords than are found in the entire utterance.

As pointed out above, the illustrative system of FIG. 1 advantageously uses key-phrases as the detection unit rather than using only keywords. Typical word spotting schemes as described above use small templates that can easily be triggered by local noise or confusing sounds. Using longer units of detection (i.e., key-phrases instead of just keywords) is advantageous because it tends to incorporate more distinctive information, resulting in more stable acoustic matching, both in the recognition phase and in the verification phase.

Specifically, a key-phrase consists of a sequence of one or more keywords and, possibly, functional words. For example, "in the morning" may be a key-phrase for a time period, and "in downtown Chicago" may be a key-phrase for a local geographic area. Such phrases are typically uttered without any breaks, even when they are uttered in spontaneous speech.

In accordance with the illustrative embodiment of the present invention described herein, the detected key-phrases are advantageously tagged with conceptual information. In fact, the key-phrases may be defined so as to directly correspond with semantic slots in a semantic frame, such as, for example, a time and a place. (A semantic frame, a term understood by those skilled in the art, comprises an information template for a given application which is to be partially or completely filled-in by a dialogue.) Unlike bottom-up phrases as defined by conventional n-gram language models (see, e.g., B. Suhm and A. Waibel, "Towards Better Language Models for Spontaneous Speech," *Proc. ICSLP*, pp. 831–834, 1994, E. P. Giachin, "Phrase Bigrams for Continuous Speech Recognition," *Proc. IEEE-ICASSP*, pp. 225–228, 1995, and S. Deligne and F. Bimbot, "Language Modeling by Variable Length Sequences: Theoretical Formulation and Evaluation of Multigrams," *Proc. IEEE-ICASSP*, pp. 169–172, 1995, each of which is hereby incorporated by reference as if fully set forth herein), the top-down key-phrases recognized by the instant illustrative embodiment may easily be directly mapped into semantic representations. Thus, the detection of these key-phrases directly leads to a robust understanding of the utterance.

Specifically, the illustrative system of FIG. 1 includes key-phrase detector 11, key-phrase verifier 12, sentence hypothesizer 13 and sentence hypothesis verifier 14. In particular, key-phrase detector 11 comprises a subword-based speech recognizer adapted to recognize a set of key-phrases using a set of phrase sub-grammars (i.e., key-phrase grammars 21) which may advantageously be specific to the dialogue state. The detected key-phrases are then advantageously labeled with semantic tags, which tags may be useful in the sentence-level parsing subsequently performed by sentence hypothesizer 13 (see below). The subword model recognizer employed by key-phrase detector 11 uses lexicon 23 and subword models 22, which may have been trained based, for example, on a conventional minimum classification error (MCE) criterion, familiar to those skilled in the art. The models themselves may, for example, comprise Hidden Markov Models (i.e., HMMs), also familiar to those skilled in the art.

Next, the detected key-phrases are verified and assigned confidence measures by key-phrase verifier 12. As described above, this process eliminates many of the false alarms that would otherwise occur. Key-phrase verifier 12 illustratively comprises a combination of subword-level verifications that use "anti-subword models," familiar to those skilled in the art, to test the individual subwords of the recognized key-phrases. Key-phrase verifier 12 uses lexicon 23, subword models 22 and anti-subword models 24, which may have been trained using, for example, a minimum verification error (MVE) criterion.

The third component of the illustrative system of FIG. 1 is sentence hypothesizer 13, which connects the verified key-phrase candidates into one or more sentence hypotheses using semantic information 25, which may, for example, be task-specific. Illustratively, a stack decoder, such as is described in T. Kawahara et al., "Concept-Based Phrase Spotting Approach for Spontaneous Speech Understanding," *Proc. IEEE-ICASSP*, pp. 291–294, 1996 (which is hereby incorporated by reference as if fully set forth herein), may be used to search the optimal hypotheses that satisfy the semantic constraints.

Finally, the best sentence hypotheses are verified both acoustically and semantically by sentence hypothesis verifier 14 to produce the final output (i.e., at least one verified sentence hypothesis). Sentence hypothesis verifier 14 uses semantic information 25, lexicon 23, subword models 26 and anti-subword models 27. Since semantic tags labelling the key-phrases were advantageously provided by key-phrase detector 11 and used by sentence hypothesizer 13, the verified sentence hypothesis essentially has its corresponding "meaning" directly associated therewith, thereby enabling the generation of a semantic frame as needed by the particular application.

Key-Phrase Detection

Key-phrase detector 11 performs key-phrase detection, which may be based on a particular sub-task which is dependent upon the dialogue state. Specifically, for each sub-task, key-phrase patterns are described as one or more deterministic finite state grammars, illustratively selected by key-phrase detector 11 from key-phrase grammars 21. These grammars may be manually derived directly from the task specification, or, alternatively, they may be generated automatically or semi-automatically (i.e., with human assistance) from a small corpus, using conventional training procedures familiar to those skilled in the art.

In general, key-phrases advantageously include functional words like "at the" or "near" in addition to the associated (conventional) keywords. This provides for more stable matching and improves detection accuracy as compared to the matching of conventional keywords alone. (See. e.g., T. Kawahara et al., "Concept-Based Phrase Spotting Approach for Spontaneous Speech Understanding" cited above.) Filler phrases that are not covered by any of the key-phrases but that often accompany the key-phrases are also defined, and are used to form phrase patterns which include an embedded key-phrase therein.

In particular, the key-phrase and filler-phrase grammars are compiled into networks, wherein key-phrases are recurrent and garbage models are embedded between key-phrase occurrences. Note, however, that simple recurrence can result in ambiguity. For example, if any repetitions of the days of the month are allowed, it is not possible to distinguish between "twenty four" and "twenty"+"four." Therefore, additional constraints that inhibit impossible connections of key-phrases are incorporated as well.

Therefore, the detection unit comprises a network of key-phrase sub-grammar automata with their permissible connections and/or iterations. Such automata can easily be extended to a stochastic language model by estimating the connection weights. The use of such models achieves wider coverage with only modest complexity when compared with sentence-level grammars.

Figure 2:
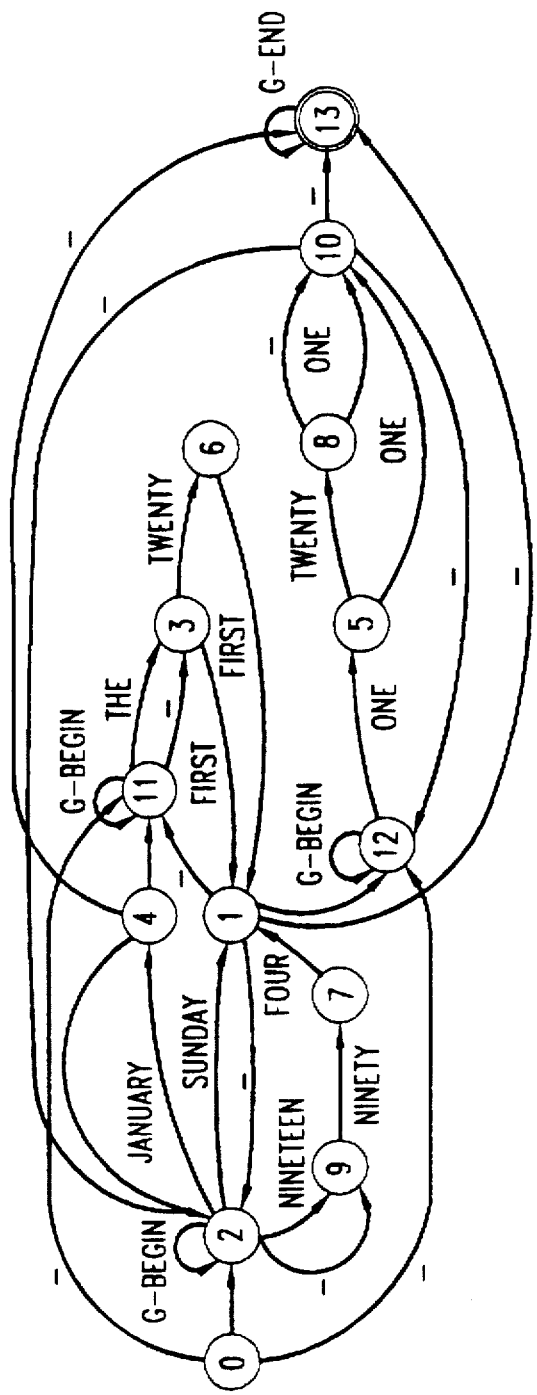
FIG. 2 shows a simplified phrase network example which may be used by the illustrative system of FIG. 1 when applied to a "date retrieval" sub-task.

By way of illustration, FIG. 2 shows a simplified (i.e., reduced) phrase network example which may be used by key-phrase detector 11 of the illustrative system of FIG. 1 when applied to a "date retrieval" sub-task. A complete realization of this network example would allow virtually any iterations of days of the week, months, days of the month, and years, with certain appropriate constraints. (The total vocabulary size of such a complete realization is 99 words.) In this particular sub-task, no carrier phrases are incorporated.

More specifically, the detection method adopted in accordance with the illustrative embodiment of the present invention described herein is based on the forward-backward two-pass search described, for example, in W. Chou et al., "An Algorithm of High Resolution and Efficient Multiple String Hypothesization for Continuous Speech Recognition Using Inter-Word Models," Proc. IEEE-ICASSP, volume 2, pp. 153–156, 1994, which is forth hereinimported by reference as if fully set forth herein. In other illustrative embodiments of the present invention, a one-pass detection method, familiar to those of ordinary skill in the art, may be used instead.

Although an A*-admissible stack-decoder (such as is described, e.g., in T. Kawahara et al., "Concept-Based Phrase Spotting Approach for Spontaneous Speech Understanding" cited above) can find a set comprising the N-best string hypotheses, the resulting N-best hypotheses are generally of similar word sequences with one or two replacements. Since the goal of this aspect of the present invention is to identify key-phrase candidates based on portions of the input utterance (as opposed to the generation of string hypotheses based on the entire input utterance), the hypotheses whose further extension will lead to the same sequence as the previously extended hypotheses will be advantageously abandoned.

Specifically, the stack decoder of the instant illustrative embodiment may be implemented by marking merging states of the key-phrase network. As is familiar to those skilled in the art, merging states correspond to the nodes where the key-phrases or filler phrases are completed and where a further extension would encroach upon the beginning of the next (i.e., a new) phrase.

When a hypothesis "popped" by the stack decoder has been tagged as a complete phrase to be output, the procedure extends the phrase by one additional word and aligns the phrase with the best extension. If this node is reached at the same time point by any of the previous hypotheses, then the current hypothesis is discarded after the detected phrase is output. Otherwise, the time point is marked for further search.

Note that the detection procedure is quite efficient without redundant hypothesis extensions and produces the correct N-best key-phrase candidates in the order of their scores. In accordance with various embodiments of the present invention the procedure may be terminated either based on having generated a desired number of phrases or, alternatively, based on a certain score threshold. For example, the detection may be terminated when the score of a hypothesis reaches a value below 0.99 times the score of the highest scoring hypothesis.

Key-Phrase Verification and Confidence Measures

Key-phrase verifier 12 of the illustrative system of FIG. 1 performs a verification of the detected phrases based on a subword-level test. In particular, for every subword n of a given phrase, a verification score is computed based on a conventional likelihood ratio (LR) test, formulated as $$LR_n = \frac{P(O|\lambda_n^c)}{P(O|\lambda_n^a)} \quad (1)$$

where O represents the sequence of observation frames, and where $\lambda_n^c$ and $\lambda_n^a$ represent the correct subword model and the anti-subword model for subword n, respectively. (The subword models are obtained from subword models 22, and the corresponding anti-subword models are obtained from anti-subword models 24.) The observation sequence O is aligned for subword n with the Viterbi algorithm as the result of recognition to obtain the probabilities $P(O|\lambda_n^c)$ and $P(O|\lambda_n^a)$. (The Viterbi algorithm is a conventional scoring method familiar to those of ordinary skill in the art.)

For every subword model, a corresponding anti-subword model has been constructed by clustering together the highly confusing subword classes. Each anti-subword model advantageously has the same structure—that is, the same number of states and mixtures—as the corresponding subword model. Performing decoding with the use of anti-subword models as references provides for improved discrimination as compared to performing unconstrained decoding of subword models, because the anti-subword models are dedicated to the verification of the specific subword. As such, the system has the added ability to reject substitution errors made by the recognizer. In this (verification) step, context-independent anti-subword models may be used, whereas the recognition step is advantageously performed with the use of context-dependent subword models.

Specifically, by taking the logarithm of equation (1) above, and by normalizing the result based on the duration length $l_n$ of the observation O, the quantity log $LR_n$ may be defined as:

$$\log LR_n = (\log P(O|\lambda_n^c) - \log P(O|\lambda_n^a))/l_n \quad (2)$$

Note that since the first term of equation (2) is exactly the recognition score, the effect of the above computation is merely to offset the computed score with that of the anti-subword model, and to normalize the result.

Key-phrase verifier 12 computes a confidence measure (CM) for each detected key-phrase by combining the corresponding subword-level verification scores. If, for example, the detected key-phrase contains N subwords, the confidence measure for the key-phrase may be a function of the corresponding N likelihood ratios. Specifically:

$$CM = f(\log LR_1, \ldots, \log LR_N) \quad (3)$$

The given key-phrase is approved if the confidence measure (CM) exceeds a certain predetermined threshold. Illustratively, the value of the threshold may, for example, be set equal to −0.15.

Different confidence measure functions may be used in various illustrative embodiments of the present invention. For example, a first illustrative confidence measure, $CM_1$, is based on frame duration-based normalization. In particular, it is exactly the difference of the two Viterbi scores obtained for the correct subword models and for the corresponding anti-subword models. Specifically:

$$CM_1 = \frac{1}{L} \sum_n (l_n \cdot \log LR_n) \quad (4)$$

In the above equation, $l_n$ represents the duration of subword n, and L is the total duration of the phrase—i.e., $L=\Sigma l_n$.

A second illustrative confidence measure, $CM_2$, is based on subword segment-based normalization. In particular, it is simply an average of the log likelihood ratios of all of the subwords of the given key-phrase. (In one particular illustrative implementation, special consideration is advantageously given for the final subwords, since the inter-word context information is lost after the phrase segmentation.) Specifically:

$$CM_2 = \frac{1}{N} \sum_n \log LR_n \qquad (5)$$

A third illustrative confidence measure, $CM_3$, focuses on those subwords for which the verification process results in a lower confidence level, rather than on the average confidence level over all of the subwords. This is advantageous because some subwords of an incorrect key-phrase may, in fact, exactly match the input phrase, whereas other subwords may be drastically different than those of the input phrase. For example, the latter part of "November" may, in some cases, match the latter part of the input phrase "December" perfectly and, as such, may tend to receive a high verification score (i.e., confidence measure), if the individual subword scores are averaged. In order to ensure its rejection, it is therefore advantageous to focus on the former part of the phrase, which will likely receive a poor verification score.

In order to so focus on subwords having a lower confidence level, the log likelihood ratio may be adjusted by assuming a normal distribution for each subword. Specifically, the mean and the variance of the log likelihood ratio for each of the subwords are computed using the samples which had been used in the training of the subword HMMs. Then, $CM_3$ may be computed by performing a summation which includes only those subwords whose log likelihood ratios are less than their expected means. Specifically:

$$CM_3 = \frac{1}{N_a} \sum_n \begin{cases} \log LR_n & \text{if } \log LR_n < 0 \\ 0 & \text{otherwise} \end{cases} \qquad (6)$$

where $N_a$ represents the number of subwords whose log likelihood ratios were, in fact, less than their expected means (i.e., the number of subwords for which $\log LR_n < 0$).

And a fourth illustrative confidence measure, $CM_4$, uses a Sigmoid function. This illustrative confidence measure may be advantageously used as a loss function for training with the minimum error rate criteria. Specifically:

$$CM_4 = \frac{1}{N} \sum_n \frac{1}{1 + \exp(-\alpha \cdot \log LR_n)} \qquad (7)$$

For each of these confidence measures (or for confidence measures used in accordance with other illustrative embodiments of the present invention), a specific threshold may be selected—if the value of the given confidence measure falls below the threshold, the candidate key-phrase is excluded from the set of verified key-phrase candidates; otherwise, it is including in the set of verified key-phrase candidates.

In accordance with various illustrative embodiments of the present invention, the likelihood ratio or confidence measure computed may be used not only for rejecting "false alarms" but also as a basis for performing a "re-scoring" on the verified phrases. See, e.g., E. Lleida and R. C. Rose, "Efficient Decoding and Training Procedures for Utterance Verification in Continuous Speech Recognition," *Proc. IEEE-ICASSP*, pp. 507–510, 1996 (which is hereby incorporated by reference as if fully set forth herein), which proposed performing decoding based on the likelihood ratio. The direct use of the likelihood ratio, however, may be unstable because of its large dynamic range. Thus, in accordance with one illustrative embodiment of the present invention, the anti-subword models are treated as garbage models, by generating garbage filler phrases, if the scores of the anti-subword models exceed those of the correct subword models (e.g., if $CM_1 < 0$). The garbage filler phrase has the same duration as, and higher scores by, for example, $CM_1$, than the original phrase. As a result, the original phrase becomes less likely to be chosen in the subsequent parsing of the sentence (see below).

Sentence Parsing

Sentence hypothesizer 13 of the illustrative system of FIG. 1 performs sentence parsing that combines the verified key-phrase candidates generated by key-phrase verifier 12 into one or more sentence hypotheses, based on semantic information 25. In one illustrative embodiment, a one-directional right-to-left search that can use left-to-right trellises of phrase candidates is employed. In another illustrative embodiment, island-driven search algorithms may be used. And since trellis parsing involves significant computation, yet another illustrative embodiment adopts a lattice parsing approach, which provides only slightly less accuracy than trellis parsing. The lattice parsing approach connects phrase candidates based on their acoustic scores and the provided semantic constraint information, which specifies permissible combinations of key-phrase tags. The score provided by the forward-backward search for key-phrase detection may be used as the acoustic score.

In order to efficiently find the most likely sentence hypotheses, a stack decoding search approach is advantageously adopted. This approach iteratively produces a series of partial hypotheses, extending the best available partial hypothesis at each iteration until a complete sentence hypothesis is produced.

Specifically, assume that the current "best" partial hypothesis is $\{w_1, w_2\}$, and that a new hypothesis may be generated by concatenating a phrase $W_3$. The evaluation function for the new hypothesis $\{w_1, w_2, w_3\}$ is computed as an offset from the upper bound score for the complete input utterance, $h_0$, as follows:

$$\hat{f}(w_1, w_2, w_3) = h_0 - (h_0 - \hat{f}(w_1)) - (h_0 - \hat{f}(w_2)) - (h_0 - \hat{f}(w_3))$$
$$= \hat{f}(w_1, w_2) - (h_0 - \hat{f}(w_3))$$

where $\hat{f}(w_i)$ comprises the result of an evaluation for a detected phrase $w_i$. The initial hypothesis is $\hat{f}$ (null)=$h_0$. Each time a new phrase is added, its offset is subtracted. The upper bound $h_0$ is computed in the forward pass of the recognition process.

The above approach is based on the short-fall method as described, for example, in W. A. Woods, "Optimal Search Strategies for Speech Understanding Control," *Artificial Intelligence*, 18:295–326, 1982, which is hereby incorporated by reference as if fully set forth herein. Note that this evaluation is A*-admissible. However, the heuristic power of this approach to guide the search efficiently may be somewhat limited. Particularly in the detection-based parsing phase, which does not assume that the entire input utterance is being covered, short hypotheses with a few words are likely to be erroneously accepted. Thus, it becomes advantageous to evaluate the skipped portions of the utterance. Specifically, therefore, in accordance with one illustrative embodiment of the present invention, a uniform penalty value proportional to the skipped length may be added as an offset. Of course, since this approximation is quite rough, it can result in a sub-optimal search. Therefore, to compensate, it is preferable that as many garbage phrases (including silence) as possible are generated, along with as many key-phrases as possible. (In one illustrative embodiment, these hypotheses may be generated during the key-phrase verification process.)

Sentence Verification

Sentence hypothesis verifier 14 of the illustrative system of FIG. 1 makes the final decision on the recognition output. Illustratively, it uses both global acoustic and global semantic information, each applied to the entire input utterance. While the key-phrase verification process makes only local decisions, the sentence hypothesis verification process combines these local results, and realizes a similar effect to that of conventional utterance verification therefrom. Note, however, that the detection-based recognition process will often accept the input utterance even if it includes a large number of unexpected carrier phrases.

Specifically, the acoustic verification process performed by sentence hypothesis verifier 14 comprises a re-scoring of the entire input utterance to ensure that a given sentence hypothesis is adequately matched. This re-scoring is performed with use of subword models 26, anti-subword models 27, and lexicon 23. Advantageously, the set of subword models (i.e., subword models 26) and the corresponding set of anti-subword models (i.e., anti-subword models 27) which are applied at this stage are more accurate that those used by key-phrase detector 11 and key-phrase verifier 12 (i.e., subword models 22 and anti-subword models 24). Thus, an acoustic re-scoring of increased accuracy may advantageously be performed.

Meanwhile, the semantic verification process evaluates the semantic "integrity" of each given sentence hypothesis. For example, in accordance with one illustrative embodiment of the present invention, semantic verification may be performed based on simple semantic constraint information specifying only whether certain constructs are semantically "legal." In such a case, the semantic analysis portion of sentence hypothesis verifier 14 may, for example, determine whether the semantic representation of a given sentence hypothesis is complete. Note, however, that in dialogue-based applications, for example, incomplete utterances are often encountered. For example, a user might just say the month "August," without specifying any particular day of the month. Generally, these "incomplete" utterances should be accepted as well.

Therefore, in accordance with one illustrative embodiment of the present invention, sentence hypothesis verifier 14 advantageously rejects a given sentence hypothesis only if it does not complete a semantic representation and if most of the input segments are rejected by the likelihood ratio test. This combined "test" may, for example, be applied to each of the sentence hypotheses until a satisfactory sentence hypothesis is encountered.

In another illustrative embodiment of the present invention, however, a more general probabilistic semantic model may be used by sentence hypothesis verifier 14. In such a case, each sentence hypothesis may be semantically scored, as well as acoustically scored, and then the combined scores may be used to select a verified sentence hypothesis to be produced as the final recognition result.

In other illustrative embodiments of the present invention, either only semantic or only acoustic verification (but not both) may be performed by sentence hypothesis verifier 14. For example, if more accurate subword and anti-subword models are not available, there may be little advantage in performing an acoustic re-scoring of the input utterance. In this case, therefore, only semantic verification may be performed, either to merely verify that a given sentence hypothesis completes a semantic representation, or, if a probabilistic semantic model is used, to generate semantic scores from which a verified sentence hypothesis may be determined as the final recognition result.

Addendum

For clarity of explanation, the illustrative embodiments of the present invention described herein are presented as comprising individual functional blocks. The functions represented by these blocks may be provided through the use of either shared or dedicated hardware, including, but not limited to, hardware capable of executing software, such as processors. For example, the functions of components presented herein may be provided by a single shared processor or by a plurality of individual processors. Illustrative embodiments of the present invention may comprise digital signal processor (DSP) hardware, read-only memory (ROM) for storing software performing the operations discussed above, and random access memory (RAM) for storing results. Very large scale integration (VLSI) hardware embodiments, as well as custom VLSI circuitry in combination with a general purpose processor or DSP circuit, may also be provided. Any and all of these implementations comprise embodiments which may be deemed to fall within the scope of the instant claims.

Moreover, although certain specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention. For example, the use of the terms "key-phrase detector," "key-phrase verifier," "sentence hypothesizer," and "sentence hypothesis verifier," as used in the instant claims herein, are intended to cover any mechanisms which perform the correspondingly identified function, and are not to be construed as being in "means-plus-function" form as provided in 35 U.S.C. § 112, paragraph 6. As such, these claim elements are not intended to be limited in their scope to "the corresponding structure . . . described in the specification and equivalents thereof." However, although there are not so limited, it should be noted that one set of embodiments of the present invention does, in fact, comprise the structures described herein and equivalents thereof.

We claim:

1. A method for performing speech recognition of a spoken utterance comprising a plurality of words, the method comprising the steps of:

performing key-phrase detection based on one or more phrase sub-grammars to generate a plurality of detected key-phrases, each detected key-phrase comprising a sequence of one or more recognized words;

performing verification on one or more of said detected key-phrases by assigning confidence measures thereto and comparing said confidence measures to one or more threshold values, thereby generating a set of verified key-phrase candidates;

connecting the verified key-phrase candidates to generate one or more sentence hypotheses based upon predetermined semantic information; and performing verification on one or more of said sentence hypotheses, thereby generating at least one verified sentence hypothesis.

2. The method of claim 1 wherein said one or more phrase sub-grammars are selected from a set of phrase sub-grammars based upon a dialogue state.

3. The method of claim 1 wherein said one or more phrase sub-grammars have been derived based on a training process using a corpus of speech samples.

4. The method of claim 1 wherein the generation of said sentence hypotheses is further based on said confidence measures.

5. The method of claim 1 wherein the detected key-phrases are labeled with semantic tags.

6. The method of claim 5 wherein the generation of said sentence hypotheses is further based on one or more of said semantic tags.

7. The method of claim 6 wherein the generation of said sentence hypotheses is further based on said confidence measures.

8. The method of claim 7 wherein the generation of said sentence hypotheses comprises determining one or more most likely sentence hypotheses based upon said confidence measures, said semantic tags, and said predetermined semantic information.

9. The method of claim 1 wherein the step of performing key-phrase detection is based on a plurality of subword models, and wherein each of said detected key-phrases further comprises a sequence of one or more subwords.

10. The method of claim 9 wherein the subword models comprise Hidden Markov Models.

11. The method of claim 9 wherein the step of performing verification on said detected key-phrases is based on a set of one or more of said subword models and a corresponding set of anti-subword models.

12. The method of claim 11 wherein the subword models and the anti-subword models comprise Hidden Markov Models.

13. The method of claim 1 wherein the step of performing verification on said sentence hypotheses comprises performing an acoustic verification thereupon.

14. The method of claim 1 wherein the step of performing verification on said sentence hypotheses comprises performing a semantic verification thereupon.

15. The method of claim 1 wherein the generating of the at least one verified sentence hypothesis comprises selecting a most likely one of said sentence hypotheses.

16. The method of claim 1 further comprising the step of generating a semantic frame based upon the at least one verified sentence hypothesis.

17. An apparatus for performing speech recognition of a spoken utterance comprising a plurality of words, the apparatus comprising:

a key-phrase detector adapted to generate a plurality of detected key-phrases based on one or more phrase sub-grammars, each detected key-phrase comprising a sequence of one or more recognized words;

a key-phrase verifier applied to one or more of said detected key-phrases, said key-phrase verifier assigning confidence measures to each of said detected key-phrases and comparing said confidence measures to one or more threshold values, thereby generating a set of verified key-phrase candidates;

a sentence hypothesizer adapted to connect the verified key-phrase candidates to generate one or more sentence hypotheses based upon the predetermined semantic information; and a sentence hypothesis verifier applied to one or more of said sentence hypotheses, thereby generating at least one verified sentence hypothesis.

18. The apparatus of claim 17 wherein said one or more phrase sub-grammars are selected from a set of phrase sub-grammars based upon a dialogue state.

19. The apparatus of claim 17 wherein said one or more phrase sub-grammars have been derived based on a training process using a corpus of speech samples.

20. The apparatus of claim 17 wherein the sentence hypothesizer generates said sentence hypotheses further based on said confidence measures.

21. The apparatus of claim 17 wherein the detected key-phrases are labeled with semantic tags.

22. The apparatus of claim 21 wherein the sentence hypothesizer generates said sentence hypotheses further based on one or more of said semantic tags.

23. The apparatus of claim 22 wherein the sentence hypothesizer generates said sentence hypotheses further based on said confidence measures.

24. The apparatus of claim 23 wherein the sentence hypothesizer determines one or more most likely sentence hypotheses based upon said confidence measures, said semantic tags, and said predetermined semantic information.

25. The apparatus of claim 17 wherein the key-phrase detector operates based on a plurality of subword models, and wherein each of said detected key-phrases further comprises a sequence of one or more subwords.

26. The apparatus of claim 25 wherein the subword models comprise Hidden Markov Models.

27. The apparatus of claim 25 wherein the key-phrase verifier operates based on a set of one or more of said subword models and a corresponding set of anti-subword models.

28. The apparatus of claim 27 wherein the subword models and the anti-subword models comprise Hidden Markov Models.

29. The apparatus of claim 17 wherein the sentence hypothesis verifier performs an acoustic verification on said sentence hypotheses.

30. The apparatus of claim 17 wherein the sentence hypothesis verifier performs a semantic verification on said sentence hypotheses.

31. The apparatus of claim 17 wherein the sentence hypothesis verifier selects a most likely one of said sentence hypotheses.

32. The apparatus of claim 17 further comprising a semantic frame generator operable to generate a semantic frame based upon the at least one verified sentence hypothesis.

* * * * *